Figure 1:
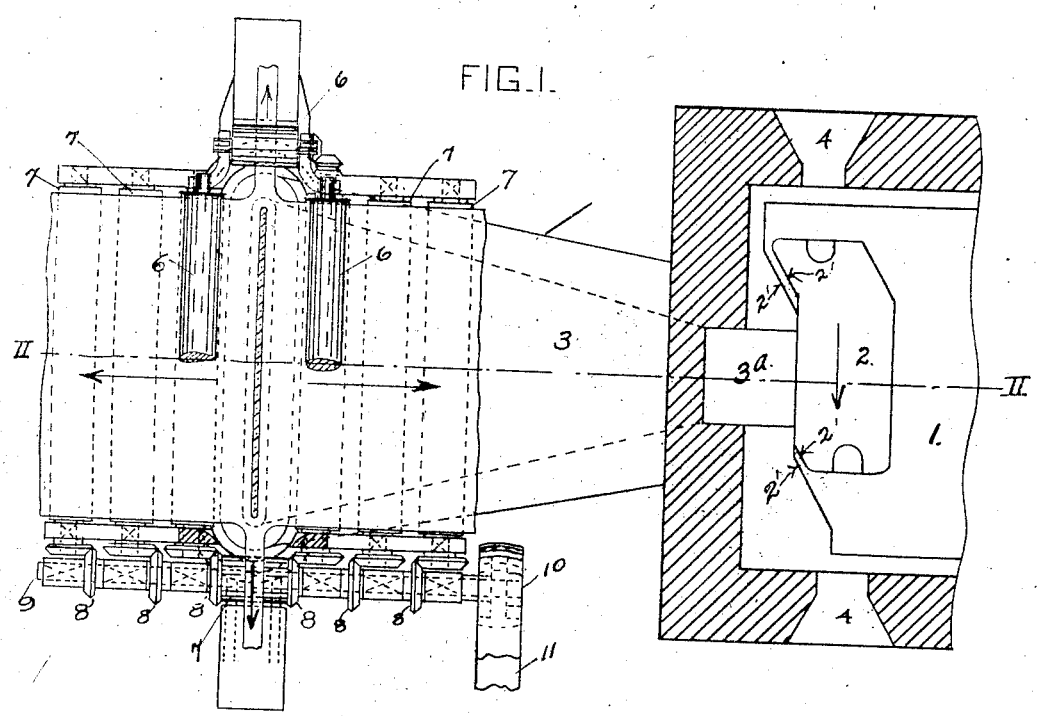

No. 832,842.

PATENTED OCT. 9, 1906.

W. L. CLAUSE & H. K. HITCHCOCK.
MANUFACTURE OF GLASS SHEETS.
APPLICATION FILED JAN. 10, 1906.

2 SHEETS—SHEET 1.

WITNESSES:

INVENTORS

No. 832,842. PATENTED OCT. 9, 1906
W. L. CLAUSE & H. K. HITCHCOCK.
MANUFACTURE OF GLASS SHEETS.
APPLICATION FILED JAN. 10, 1906.

2 SHEETS—SHEET 2.

WITNESSES:
INVENTORS
William L. Clause,
Halbert K. Hitchcock,
by Christy & Christy ATTY'S

UNITED STATES PATENT OFFICE.

WILLIAM L. CLAUSE, OF SEWICKLEY, AND HALBERT K. HITCHCOCK, OF TARENTUM, PENNSYLVANIA.

MANUFACTURE OF GLASS SHEETS.

No. 832,842.     Specification of Letters Patent.     Patented Oct. 9, 1906.

Application filed January 10, 1906. Serial No. 295,451.

*To all whom it may concern:*

Be it known that we, WILLIAM L. CLAUSE, residing at Sewickley, and HALBERT K. HITCHCOCK, residing at Tarentum, in the county of Allegheny and State of Pennsylvania, citizens of the United States, have invented or discovered certain new and useful Improvements in the Manufacture of Glass Sheets, of which improvements the following is a specification.

In Letters Patent Nos. 805,064 and 805,065, dated November 21, 1905, a method of and apparatus for manufacturing glass sheets is described and claimed, said method consisting, generally stated, in causing a flow of molten glass through a slot, orifice, or channel and then applying to the glass as it exudes from such slot or opening a pull or tension whereby the glass is drawn to sheet form. In passing through the slot or opening the outer portion or layers of the stream of glass will adhere to the walls of such slot or opening, thereby forming an anchorage for such outer layer or portions, so that when tension is applied a stretch or elongation of the glass can occur. When a plastic substance, such as molten glass, is subjected to a pull or tension such as that described above, there is a constant tendency for the "fining" down or reduction of the cross-section of the material. In the method described this tendency to reduction or fining down is prevented by the feeding in of the middle portions or portion of the stream of glass into the thin-walled shell formed when the colder surface of the glass is subjected to tension, the glass thus fed in preventing the indrawing or fining beyond certain dimensions. In the practice of this method it is found that "lines" sometimes occur on the finished sheet, due, it is believed, either to the chilling of minute portions of the outer layers as the glass passes from the anchorage to the sheet form or to the breaking away of small particles of chilled glass from their anchorage and their passage into the sheet which is being formed. When these cooled particles are subjected to the stretch or elongation, they will produce fine hair-like lines on the surface of the sheet, thereby reducing its value as a marketable article.

The invention described herein has for its object the maintenance of the surface of the glass at the formative point or point of sheet formation produced by the applied tension at a uniformly-constant temperature; and it is a further object of the invention to feed through the slot, orifice, or channel an amount of glass greater than that required to form the desired sheet and to cause this surplus glass to flow away from the direction of sheet formation, thereby preventing the entrance of any chilled particles from the anchorage into the sheet being formed.

The invention is hereinafter more fully described and claimed.

Figure 2:
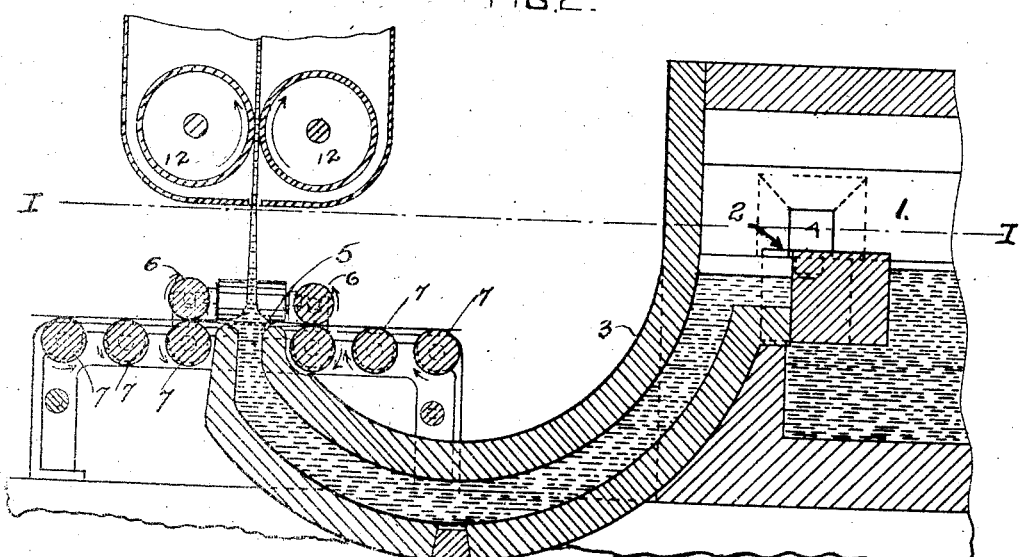
Figure 3:
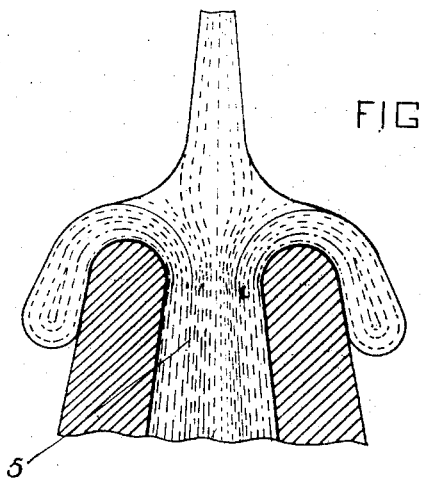
Figure 4:
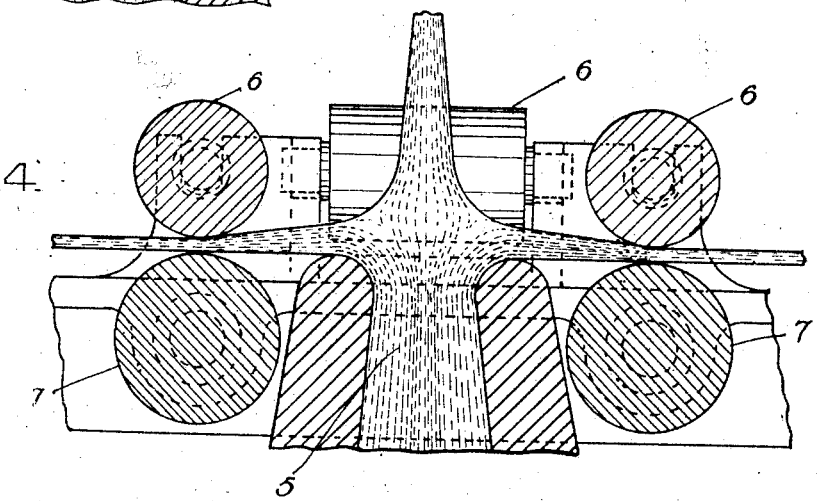
Figure 5:
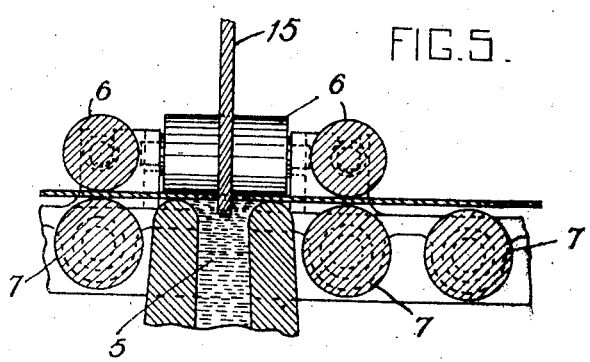

In the accompanying drawings, forming a part of this specification, Figure 1 is a sectional plan view of a form of apparatus adapted to the practice of our invention. Fig. 2 is a sectional elevation, the plane of section being indicated by the line II II, Fig. 1. Fig. 3 is a sectional detail view illustrating a method of causing the outward flow of the surplus glass from the direction of sheet formation. Fig. 4 is a similar view, showing another method of producing such outward flow, and Fig. 5 is a view illustrating the manner of initiating the process or method illustrated in Fig. 4.

The maintenance of a constant temperature at the point of sheet formation can be effected in many ways—as, for example, by regulating the flow of glass from the slot or orifice. The greater such flow the higher will be the temperature of the glass at the point of sheet formation, or the maintenance of such uniform temperature may be attained by the application of heat at the formative point. In the practice of the invention the slot or orifice 5, which has a shape corresponding approximately to that of the article to be produced, is connected by a channel 3 to a suitable source of supply—such, for example, as to the tank-furnace 1. The forced flow of glass through the channel and from the orifice can be effected by any suitable means—such, for example, as the maintenance of the level of the glass in the furnace above the plane of the slot 5, as shown in Fig. 2—the higher the level of glass in the chamber above the slot the greater the flow or exudation therefrom. Any suitable means may be employed for regulating this flow through the channel—such, for example, as a floating stopper 2, which is provided with inclined faces 2ª, adapted to move along similar faces 2ᵇ in the end wall of the furnace when the stopper is shifted longitudinally, thereby either forcing the stopper away from the outlet 3ª or permitting it to move inward and close such outlet. This longitudinal shifting of the stopper can readily be effected by means of a rod passed through openings 4 in the side walls and engaging the stopper.

The outward flow of the surplus glass from the direction of sheet formation can be effected in many ways,—as, for example, in Fig. 3 provision is made to allow the surplus glass to flow outwardly under the action of gravity over the end walls of the slot. It will be readily understood that when the glass flows by gravity, as shown in Fig. 3, the greater the feed through the slot the quicker will be the outward flow, and the glass at the formative point will be maintained at a higher temperature; but if the flow through the slot is slow the outward flow will be correspondingly slow, and thus affording an opportunity for the cooling of the glass up into close proximity to the formative point or point of applied tension. By this means a regulation of the temperature at the formative point can be attained. The outward flow of the glass from the formative point can be regulated by varying the inclination of the top surface of the slot-wall. It is preferred, however, to employ means whereby a more positive and certain outward movement of the surplus glass from the slot can be attained. A suitable means to this end consists of several series of rolls 7, arranged in such relation to the slot that the outwardly-flowing glass will rest thereon and be moved outwardly by the frictional contact of such rolls with the glass. As will be seen by reference to Figs. 1 and 2, a series of such feeding-rollers are arranged opposite each side and edge of the glass as it exudes from the slot, so that by the action of these rollers the glass will be drawn away in opposite directions. It will be understood that the number of these feed devices can be increased or diminished, as required by the shape of the article to be produced. While the frictional engagement of the rollers with the outwardly-moving glass will generally be sufficient to insure the required movement, it is preferred to employ rollers 6, arranged above one of the rollers of each of the series, so that there will be a bite of these rollers 6 and 7 on opposite sides of the glass. Each of the series of rollers may be driven independently or, as shown, from a common motor.

Any suitable means may be employed for applying tension to the exuding glass for the purpose of forming sheets—such, for example, as that shown and described in applications for Letters Patent, Serial Nos. 275,462 and 275,463, filed August 23, 1905, by H. K. Hitchcock, and in the drawings we have shown a portion of such apparatus including the rollers 12, which first engage and apply tension to the glass.

In commencing the manufacture of sheets a bait 15 is arranged so as to extend between the rollers 12 and with its lower end in such relation to the slot that glass exuding therefrom would adhere to the bait. When positively-acting means are employed for causing the outward flow of the glass, similar baits 15ª are arranged so that their inner ends will be adjacent to the slot, while their outer portions are within the bites of the feeding-rollers. As soon as these baits are suitably arranged and heated the glass is permitted to flow from the tank through the channel and exude from the slot or opening. As it reaches the slot or opening it will adhere to the heated ends of the baits, and when the rollers 12 and the feed-rollers 6 and 7 are started in operation there will be a movement of the glass vertically to form a sheet and laterally by the rollers 6 and 7. It will be understood that the rate of this latter movement of the glass will be determined by the conditions attendant on the formation of the sheet. If a higher surface temperature is required at the formative point, the flow of glass through the channel 3 and the rotation of the rollers 6 and 7 are so regulated that there will be a more rapid flow of hot glass to the formative point. If, however, a lower surface temperature is required at the slot or opening, the speed of the rollers 6 and 7 and the rate of feed of the glass to the slot are so adjusted as to permit of a reduction of surface temperature at the formative point. In addition to thus providing for the regulation of the temperature and the maintenance of an approximately constant surface temperature at the formative point the outward movement of the glass from the formative point at an angle to the direction of sheet formation will carry away any cooled particles which may become detached from the anchorage from the direction of sheet formation and will not, therefore, become incorporated in the sheet, and, further, the stains or blemishes which are sometimes found in the outer portion of the stream of glass flowing through the slot will be carried away with the outwardly-flowing glass, and only glass from the interior portions of such stream will be formed into the principal sheet.

It is characteristic of our improved method that, in effect, we provide a constantly-changing anchor for the glass which is to be formed into the thin shell or outer surfaces of the finished sheet and also for the removal of any cooled glass from the point of sheet formation. It is a further characteristic of the invention that those portions of the glass—i. e., the outer portions—which are most liable to contain imperfections or blemishes are not incorporated in the principal product, but are drawn outward away from the core or inner portion of the exuding glass, which is formed, as shown in Figs. 3 and 4, into the principal product. The glass which is drawn away from the line of sheet formation may be utilized by the employment of suitable means—as, for example, in the construction shown the outwardly-drawn glass can be reduced to sheets, which, although inferior to the principal product, would have a marketable value.

It will be understood by those skilled in the art that by varying the relative rate of movement the glass formed in the principal product and that of the glass drawn away from the plane of formation of the principal product the position of the point of formation can be varied within wide limits.

We claim herein as our invention—

1. As an improvement in the art of manufacturing glass articles, the method herein described which consists in causing the glass to flow through a slot or orifice and dividing the exuding glass into two or more streams by applying tension to such glass in two or more directions at an angle to each other.

2. As an improvement in the art of manufacturing glass articles, the method herein described which consists in causing glass to flow through a slot or orifice causing such exuding glass to move away from the slot or orifice in two or more streams and imparting to such streams of glass the desired shape or contour.

3. As an improvement in the art of manufacturing glass articles, the method herein described which consists in causing glass to flow through a slot or orifice, drawing portions of the exuding glass at an angle to and away from the stream and drawing another portion of the exuding glass in or approximately in the plane of the stream through the orifice or opening.

4. As an improvement in the art of manufacturing glass articles, the method herein described which consists in causing glass to flow through a slot or orifice, drawing the outer portions of the exuding stream in directions at an angle to and out of the line of flow and drawing the core or inner portions of the exuding stream in or approximately in the direction of flow of such glass.

5. As an improvement in the art of manufacturing glass articles, the method herein described which consists in causing a greater flow of glass through a slot or orifice than is required to form the desired article, causing a portion of such glass to assume the desired shape and removing the surplus glass from the point of formation of the principal product.

6. As an improvement in the art of manufacturing glass articles, the method herein described which consists in causing a flow of glass through a slot or orifice, applying a forming tension to a portion of the exuding glass and regulating the surface temperature of the glass at the point of formation by causing a portion of the exuding glass to flow away from the direction of formation of the principal product.

7. As an improvement in the art of manufacturing glass articles, the method herein described which consists in causing a greater flow of glass to a given point than is required to form the desired article, causing a portion of such glass to assume the desired shape, and removing the surplus glass from the point of formation of the desired product.

8. As an improvement in the art of manufacturing glass articles, the method herein described which consists in causing the surface glass of the body of metal to move away from a given point and causing the glass from the interior of the body to assume the desired shape.

9. In an apparatus for the manufacture of glass articles the combination of a slot or orifice, means for causing a flow of glass through the slot or orifice, means for applying tension to glass exuding from the slot or orifice in the direction of flow through the slot or orifice, and means for drawing glass away from the direction of applied tension whereby the glass is divided into two or more streams or bodies as it exudes from the slot.

In testimony whereof we have hereunto set our hands.

WILLIAM L. CLAUSE.
HALBERT K. HITCHCOCK.

Witnesses:
H. S. WHENETT,
L. T. WHITFIELD.